United States Patent
Osuka et al.

(10) Patent No.: US 9,571,433 B2
(45) Date of Patent: Feb. 14, 2017

(54) COMMUNICATION DEVICE, RELAY SERVER FOR RELAYING DATA FROM COMMUNICATION DEVICE, AND COMMUNICATION SYSTEM INCLUDING THEM

(75) Inventors: Kyosuke Osuka, Osaka (JP); Yasushi Yoneda, Osaka (JP); Takehito Yamaguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 782 days.

(21) Appl. No.: 13/609,403

(22) Filed: Sep. 11, 2012

(65) Prior Publication Data

US 2013/0067029 A1   Mar. 14, 2013

(30) Foreign Application Priority Data

Sep. 12, 2011   (JP) ................. 2011-197968

(51) Int. Cl.
*G06F 15/16* (2006.01)
*H04L 12/58* (2006.01)
*H04W 4/18* (2009.01)
*H04L 29/08* (2006.01)

(52) U.S. Cl.
CPC ............ *H04L 51/066* (2013.01); *H04L 67/04* (2013.01); *H04L 67/2823* (2013.01); *H04W 4/18* (2013.01)

(58) Field of Classification Search
CPC .... H04L 67/2823; H04L 67/04; H04L 51/066; H04W 4/18
USPC ....................................... 709/217
See application file for complete search history.

(56) References Cited

U.S. PATENT DOCUMENTS

| 7,281,048 B2* | 10/2007 | Watanabe | H04N 1/00148 382/305 |
| 7,562,300 B1* | 7/2009 | Tobias et al. | 715/727 |
| 8,068,698 B2* | 11/2011 | Klassen | H04N 1/00244 345/619 |
| 8,711,228 B2* | 4/2014 | Ko | G11B 27/034 348/207.11 |
| 2006/0095422 A1 | 5/2006 | Kikuchi | |
| 2008/0052026 A1* | 2/2008 | Amidon | H04N 5/23203 702/104 |
| 2011/0107234 A1 | 5/2011 | Lee et al. | |

FOREIGN PATENT DOCUMENTS

| JP | 2000-358230 | 12/2000 |
| JP | 2003-050703 | 2/2003 |
| JP | 2006-119943 | 5/2006 |
| JP | 2007-316926 | 12/2007 |
| JP | 2008-112446 | 5/2008 |
| JP | 2008-236159 | 10/2008 |
| JP | 2011-096251 | 5/2011 |

* cited by examiner

*Primary Examiner* — Kevin Bates
*Assistant Examiner* — Nazia Naoreen
(74) *Attorney, Agent, or Firm* — Panasonic IP Management

(57) ABSTRACT

A communication device for transmitting data via a first server to a second server includes an acquiring unit operable to acquire, from the first server, server information as information indicating a style of data acceptable to the second server, a converting unit operable to convert a style of data to be transmitted into the style acceptable to the second server, based on the server information, and a transmitting unit operable to transmit data converted by the converting unit to the first server.

12 Claims, 8 Drawing Sheets

Fig. 5

| 310 EXTERNAL SERVER INFORMATION | EXTERNAL SERVER BASIC INFORMATION | (1) LOGO MARK IMAGE DATA | ⎫<br>⎬ 311<br>⎭ |
| --- | --- | --- | --- |
| | | (2) SUPPORTED IMAGE FORMAT (JPEG, MPEG, .....) | |
| | | (3) MAXIMUM UPLOAD SIZE<br>(DATA SIZE OF IMAGE DATA TO BE UPLOADED) | |
| | | (4) MAXIMUM NUMBERS OF PIXELS FOR UPLOAD<br>(VERTICAL × HORIZONTAL)<br>(NUMBERS OF PIXELS OF IMAGE DATA TO BE UPLOADED) | |
| | | (5) MAXIMUM UPLOAD BIT RATE<br>(BIT RATE FOR TRANSMITTING MOVING IMAGE) | |
| | EXTERNAL SERVER RECOMMENDATION INFORMATION | (a) RECOMMENDED IMAGE FORMAT | ⎫<br>⎬ 312<br>⎭ |
| | | (b) RECOMMENDED UPLOAD SIZE | |
| | | (c) RECOMMENDED NUMBERS OF PIXELS FOR UPLOAD<br>(VERTICAL × HORIZONTAL) | |
| | | (d) RECOMMENDED UPLOAD BIT RATE | |

COMMUNICATION DEVICE, RELAY SERVER FOR RELAYING DATA FROM COMMUNICATION DEVICE, AND COMMUNICATION SYSTEM INCLUDING THEM

BACKGROUND

1. Technical Field

The art disclosed herein relates to a communication device, and particularly relates to a communication device that communicates with a server.

2. Related Art

There are known image sharing services that enable many people to share images captured by image capture devices such as digital cameras. The image sharing services are provided by servers (image sharing servers) and the like. Users can use the image sharing services by accessing these servers. A communication device having a camera which is disclosed in JP 2008-236159A, for example, captures an image of a code indicating an address of an image sharing server which stores images, and accesses the image sharing server in accordance with the captured code.

A configuration in which a communication device accesses a target server (such as an image sharing server) via a portal server is also known. That is to say, according to the configuration, the communication device accesses the portal server, and the portal server accesses the target server. With the configuration, the communication device can access a desired server by accessing the portal server.

According to the configuration that enables a communication device to access a server as an access target via a portal server, the communication device does not need to manage an address of the target server. Therefore, even when an address of the target server is changed, for example, the communication device is only required to access the portal server so as to access the target server. The communication device is very convenient in this respect.

SUMMARY

In the above configuration, the communication device consumes power by transmission of data to the portal server. Particularly, when a size of data transmitted to the portal server by the communication device becomes larger, there is a problem that power consumption becomes larger. Further, when a size of data to be transmitted becomes larger, there is also a problem that a transmission time becomes larger.

Further, when the portal server transmits data received from the communication device to the external server, there may be a case where the portal server cannot transmit the data to the external server because the data to be transmitted to the external server does not conform to a style (a data format, a data size, a transfer bit rate, or the like) that is acceptable to (can be handled by) the external server. In this case, a user is required to convert the style of the data into the acceptable style to the external server, and to retransmit the converted data to the portal server. Such retransmission increases a workload for the user, and increases power and time consumption.

In view of the above problems, as well as other concerns, a communication device and a portal server are provided that can reduce the workload, and power and time consumption in the data transmission to the external server via the portal server in comparison to the conventional approach.

In a first aspect, there is provided a communication device for transmitting data via a first server to a second server. The communication device includes an acquiring unit operable to acquire, from the first server, server information as information indicating a style of data acceptable to the second server, a converting unit operable to convert a style of data to be transmitted into the style acceptable to the second server, based on the server information, and a transmitting unit operable to transmit the data converted by the converting unit to the first server.

In a second aspect, there is provided a relay server for receiving data from a communication device and transmitting the received data to a target server. The relay server includes an acquiring unit operable to acquire, from the target server, server information as information indicating a style of data acceptable to the target server, and a transmitting unit operable to transmit the server information to the communication device.

According to the communication device and the first server (the relay server) in the above aspects, before the communication device transmits data to the first server, the style of the data can be converted into the style that is acceptable for the second server (the target server). Therefore, an error occurring when the data are transmitted from the first server to the second server can be prevented. Consequently, a workload, and time and power consumption caused when the data is retransmitted to the first server can be reduced in comparison to the conventional approach.

BRIEF DESCRIPTION OF DRAWINGS

FIG. 5 is a diagram showing a configuration of external server information according to the present embodiment;

DETAILED DESCRIPTION OF PREFERRED EMBODIMENTS

Embodiments will be described below with reference to drawings. A digital camera is described below as an example of a communication device of the embodiment.

In the detailed description, certain unnecessary portions regarding, for example, conventional technology, redundant descriptions of substantially the same configuration may be omitted as appropriate for ease of description.

The following description and the accompanying drawings are disclosed to enable those skilled in the art to sufficiently understand the present disclosure, and are not intended to limit the subject matter of the claims.

1. Overview

A relationship between a digital camera, a portal server, and an external server of the present embodiment is described with reference to FIG. 1. A digital camera 100, a portal server 300, and an external server 400 are connected by a communication line 200.

The digital camera 100 directly communicates with the portal server 300. On the other hand, the digital camera 100 does not directly communicate with the external server 400. The digital camera 100 accesses the portal server 300, and uploads image data to the portal server 300 by assigning one of the external servers 400 as an upload destination. The image data is uploaded to the portal server 300 and then the portal server 300 uploads the image data to the external server 400 which is assigned by the digital camera 100. In this way, the image data within the digital camera 100 is finally uploaded to the external server 400.

When the digital camera 100 uploads image data to the portal server 300, the user operates the digital camera 100 to select the external server 400 to which the user wants to finally upload the image data. When there are plural external servers 400, the user selects one external server 400 to which the user wants to upload the image data, from the plurality of external servers 400. Further, the user selects an image that the user wants to upload to the selected external server 400.

At this time, the digital camera 100 presents the user with information based on external server information (to be described in detail later), as reference information for selecting the external server 400 and the image data. By referring to the presented information, the user can select the external server 400 to which the image data is to be uploaded, and the image data that the user wants to upload, and can instruct the digital camera 100 to upload the image data. Further, the digital camera 100 can convert the image data based on the external server information.

Hereinafter, regarding the external servers, reference signs "400A", "400B", and "400C" are used for explaining individually external servers, and a reference sign "400" is used for explaining generally the external server without distinction.

Figure 1:
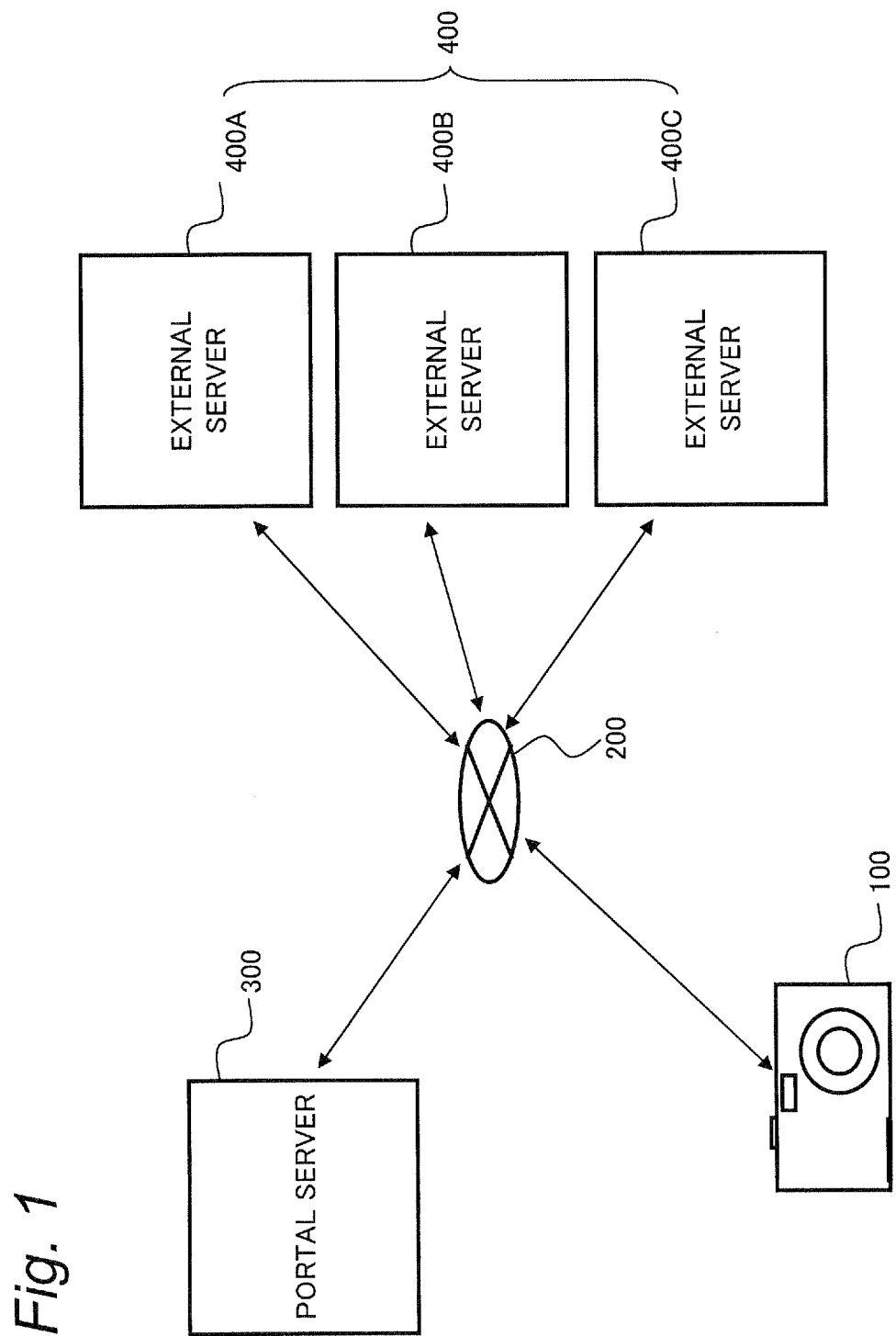
FIG. 1 is a diagram showing a network that connects a digital camera, a portal server, and external servers according to a present embodiment.

When three external servers 400A, 400B, and 400C are present as shown in FIG. 1, the portal server 300 holds external server information concerning each of the plurality of external servers 400A, 400B, and 400C. By accessing the portal server 300, the digital camera 100 can acquire external server information of the three external servers from the portal server 300.

The external server information includes external server basic information indicating a style of image data with which the image data can be uploaded to the external server 400, and external server recommendation information indicating a recommended style of image data that can be uploaded to the external server 400. The portal server 300 periodically acquires the external server basic information from the external server 400 in advance and updates the external server basic information within the portal server 300 to the latest information. When the external server basic information is updated, the portal server 300 updates the external recommendation information based on the external server basic information.

The digital camera 100 and the portal server 300 compose a communication system. The communication system may further include the external server 400.

Hereinafter, the "style" includes a data format, a data size, number of pixels of data, a data transfer rate, and so on.

Hereinafter, the image includes a still image (a photograph) and a moving image.

As shown in FIG. 1, the external server 400 may also be configured by a plurality of external servers (400A, 400B, 400C). Hereinafter, a collective term of the plurality of external servers (400A, 400B, 400C), or one arbitrary external server among the plurality of external servers, is referred to as the external server 400.

2. Configuration

Configurations of the digital camera 100, the portal server 300, and the external server 400 will be described below.

2-1. Configuration of Digital Camera

Figure 2:
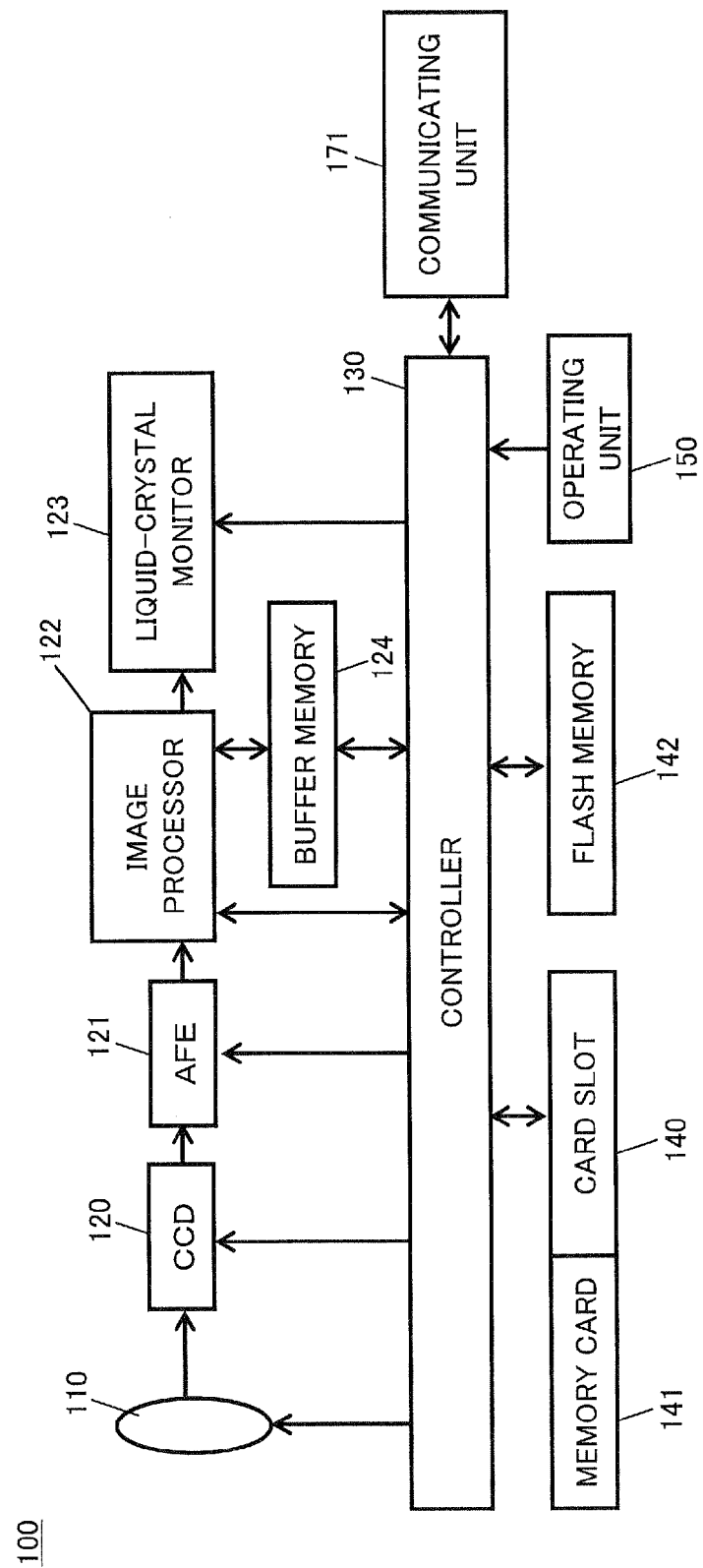
FIG. 2 is a block diagram showing an electrical configuration of the digital camera according to the present embodiment.

The configuration of the digital camera 100 will be described below with reference to FIG. 2. The digital camera 100 includes an optical system 110, a CCD image sensor 120, an analog front end (AFE) 121, an image processor 122, a liquid-crystal monitor 123, a buffer memory 124, a controller 130, a card slot 140, a memory card 141, a flash memory 142, and an operating unit 150.

The CCD image sensor 120 captures an image of a subject formed through the optical system to generate image data based on the captured image.

The AFE 121 and/or the image processor 122 perform/performs various processes to the generated image data.

The flash memory 142 and/or the memory card 141 mounted to the card slot 140 store/stores the processed image data.

The liquid-crystal monitor 123 displays an image based on the image data stored in the flash memory 142 and/or the memory card 141, in accordance with a user operation received by the operating unit 150. Further, the liquid-crystal monitor 123 displays a GUI (Graphical User Interface) for enabling the user to set the digital camera 100 and select a transmission destination of the image data, or the like.

The controller 130 entirely controls an operation of each unit in the digital camera 100. The controller 130 may be configured by a hard-wired electronic circuit or may be configured with a microcomputer or the like. The controller 130 may also be configured with one semiconductor chip together with the image processor 122 and the like.

The flash memory 142 is an internal memory for storing image data or the like. The flash memory 142 also stores portal server account information issued by the portal server 300.

The portal server account information is authentication information for the digital camera 100 to obtain an access permission from the portal server 300. The portal server account information includes an ID and a password to log into the portal server 300. The digital camera 100 can access a storage region within the portal server 300, and can also record (upload) a generated content (a captured image or the like) and read (download) the content, by logging into the portal server 300 with using the portal server account information.

The buffer memory 124 is a memory device that functions as a work memory of the image processor 122 and the controller 130. The buffer memory 124 can be implemented with a DRAM (Dynamic Random Access Memory) and the like.

The card slot 140 is a connection device to which the memory card 141 can be mounted. The card slot 140 can be mechanically or electrically connected to the memory card 141, by mounting the memory card 141. The card slot 140 may include a function for controlling the memory card 141.

A communicating unit 171 is a wireless or wired communication interface. The controller 130 can be connected to the communication line 200 such as the Internet through the communicating unit 171.

For example, the communicating unit 171 can be implemented with a wireless LAN module, a wired LAN interface, or the like. When the communicating unit 171 performs radio communications with a wireless LAN module or the like, the communicating unit 171 is connected to the communication line 200 via an external wireless LAN access point.

The operating unit 150 is a collective term of an operation button and an operation lever which are provided on a casing of the digital camera 100, and receives a user operation. When the operating unit 150 receives the user operation, the operating unit 150 transmits a signal instructing the controller 130 to perform various operations in accordance with the received operation.

2-2. Configuration of Portal Server

Figure 3:
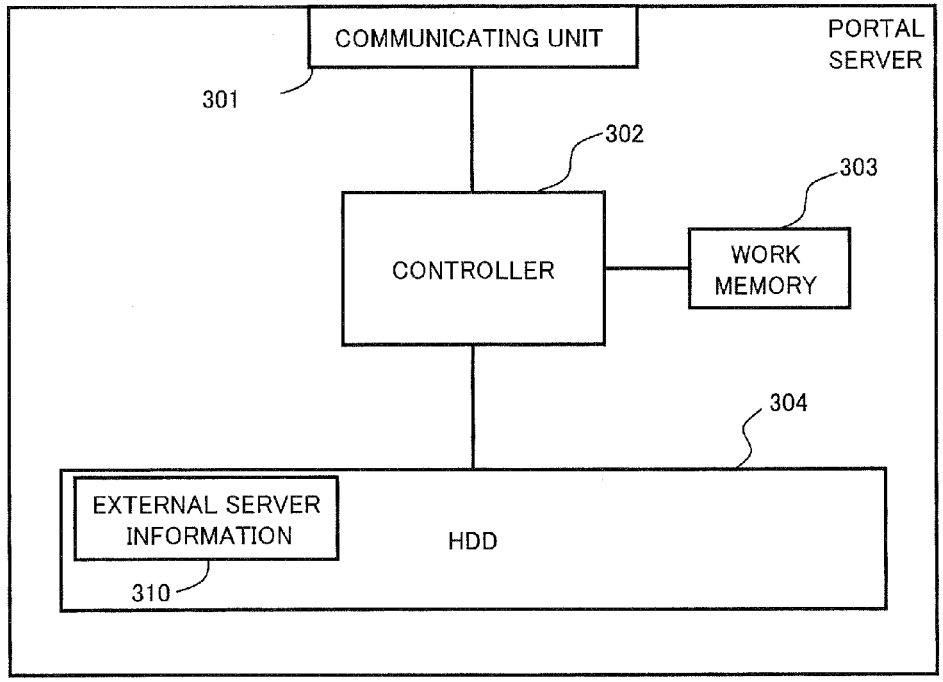
FIG. 3 is a block diagram showing an electrical configuration of the portal server according to the present embodiment.

The configuration of the portal server 300 will be described with reference to FIG. 3. The portal server 300 is a device that relays data transmission from the digital camera 100 to the external server 400. The portal server 300 includes a controller 302, a work memory 303, an HDD 304, and a communicating unit 301.

The HDD 304 is a large-capacity disc drive that can store various data. The HDD 304 stores pieces of account information (hereinafter, "portal server account information") for permitting various devices such as the digital camera 100 to access the portal server 300. The portal server 300 manages the pieces of portal server account information of the devices that are permitted to access the portal server 300, by recording the portal server account information into the HDD 304 in a form of a portal server account information management table. The HDD 304 secures a storage region that is related to the portal server account information, for each piece of portal server account information.

The portal server account information can be issued to the digital camera 100 by the portal server 300 when the digital camera 100 accesses the portal server 300 for the first time. The issued portal server account information is recorded into the HDD 304, and is also transmitted to the digital camera 100. The portal server 300 generates a storage region that is related to each piece of portal server account information, on the HDD 304. The digital camera 100 records the portal server account information into the flash memory 142. The portal server account information stored in the flash memory 142 is used when the digital camera 100 logs into the portal server 300.

The HDD 304 stores account information (hereinafter, referred to as "external server account information", and a detail thereof will be described later) that is used when the portal server 300 accesses the external server 400. The external server account information is used when the user of the digital camera 100 directly accesses the external server 400.

Plural pieces of external server account information may be stored into the HDD 304. In this case, the plural pieces of external server account information are related to one piece of portal server account information, and stored. For example, when the three external servers 400A, 400B, and 400C are present as shown in FIG. 1, the respective pieces of account information of the three external servers 400A, 400B, and 400C can be related to the account information of one portal server.

The portal server 300 stores transmission possibility information which is related to the portal server account information. The transmission possibility information is information indicating whether data can be transmitted to the external server 400 (that is, whether the external server 400 can be accessed). The portal server 300 sets the transmission possibility information for each external server 400, in accordance with presence or absence of the external server account information. That is, when the external server account information corresponding to the external server 400 is related to the portal server account information, the transmission possibility information concerning the external server 400 is set to "possible". On the other hand, when the external server account information corresponding to the external server 400 is not related to the portal server account information, the transmission possibility information concerning the external server 400 is set to "impossible".

In order to enable the portal server 300 to transmit an image data to the external server 400, the external server account information corresponding to the external server 400 needs to be stored in advance and be related to the portal server account information. Relating the external server account information to the portal server account information will be described below.

The user of the digital camera 100 acquires in advance the external server account information of the external server 400 with a smart phone, a personal computer, or the like. Then, the user logs into the portal server 300 from the smart phone, the personal computer, or the like, with portal server account information of the user. Next, the user inputs the external server account information acquired in advance to the portal server 300. The portal server 300 relates the input external server account information to the portal server account information at the time of login. At this time, the portal server 300 sets the transmission possibility information concerning the external server 400 corresponding to the input external server account information, to "possible". By this procedure, the portal server 300 can manage the portal server account information and the external server account information by relating them to each other.

Relating the external server account information to the portal server account information makes it possible to perform the following operations, for example. The digital camera 100 logs into the portal server 300 with the portal server account information in accordance with the user operation, and transmits image data to the portal server 300 with the external server 400A designated as the transmission destination. The portal server 300 can access the external server 400A with the external server account information that is related to the portal server account information, and can transmit the image data that is transmitted by the digital camera 100, to the external server 400A.

The controller 302 is a processing unit that performs various processes in the portal server 300. The controller 302 is electrically connected to the work memory 303, the HDD 304, and the communicating unit 301. The controller 302 can write data into the HDD 304 and read data from the HDD 304. When portal server account information is newly issued, the controller 302 generates a storage region related to the portal server account information, on the HDD 304.

The work memory 303 is a memory that temporarily stores information that is necessary for the controller 302 to perform various operations.

The communicating unit 301 can receive image data from a communication device such as the digital camera 100 through the communication line 200. The communicating unit 301 can be implemented with a wired LAN interface or a wireless LAN module, for example.

The controller 302 acquires portal server account information from the digital camera 100 through the communicating unit 301. The controller 302 can control data writing into and data reading from the storage region of the HDD 304 that is related to the acquired portal server account information, in accordance with a request from the digital camera 100.

The HDD 304 stores information 310 (hereinafter, referred to as "external server information") indicating a style or the like of image data that can be accepted (handled) by the external server 400. The external server information 310 will be described in detail later.

2-3. Configuration of External Server

Figure 4:
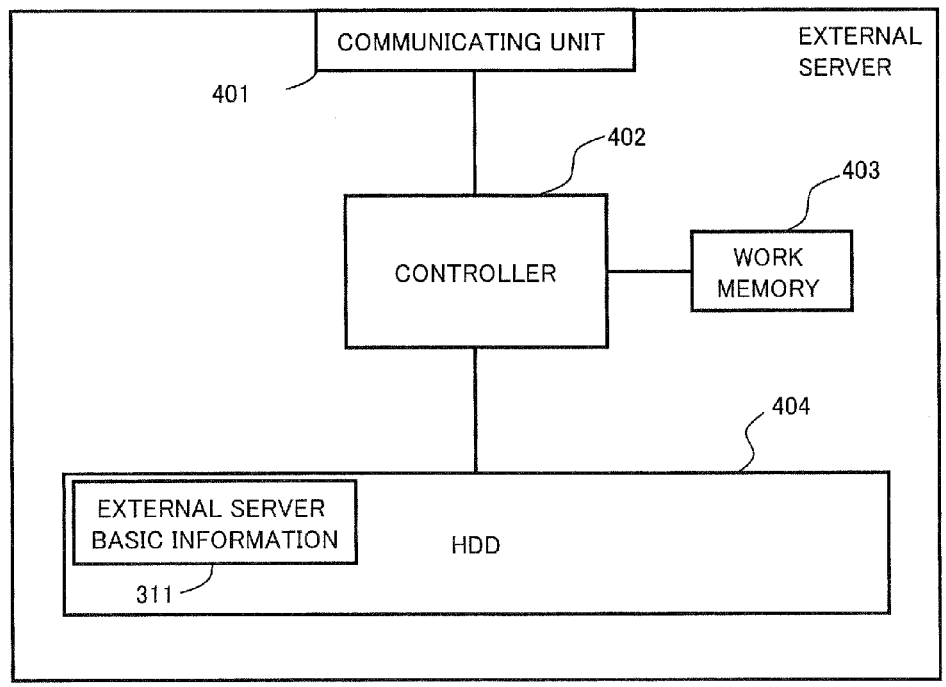
FIG. 4 is a block diagram showing an electrical configuration of the external server according to the present embodiment.

The configuration of the external server 400 will be described with reference to FIG. 4. The external server 400 is a server that provides an image sharing service and the like. The external server 400 includes a controller 402, a work memory 403, an HDD 404, and a communicating unit 401.

The HDD 404 is a large-capacity disc drive that stores various data. The HDD 404 stores external server account information for permitting an external device to access the external server 400. The external server 400 records and manages the external server account information in the HDD 404 in a form of a external server account information management table. The HDD 404 secures a storage region that is related to each piece of external server account information.

As described above, preferably, the external server account information is acquired from the external server 400 in advance with a smart phone, a personal computer, or the like, by the user of the digital camera 100. Then, the user sets the acquired external server account information, into the portal server 300.

The controller 402 is a processing unit that performs various processes on the external server 400. The controller 402 is electrically connected to the work memory 403, the HDD 404, and the communicating unit 401. With this configuration, the controller 402 can write data into the HDD 404 and read data from the HDD 404. When external server account information is newly issued, the controller 402 generates a storage region that is related to the external server account information, on the HDD 404.

The work memory 403 is a memory that temporarily stores information that is necessary for the controller 402 to perform various process operations.

The communicating unit 401 can receive image data from other device such as the portal server 300 through the communication line 200. The communicating unit 401 can be implemented with a wired LAN interface or a wireless LAN module, for example.

The controller 402 acquires external server account information from the portal server 300 through the communicating unit 401. Then, when the acquired external server account information matches the external server account information stored in the HDD 404, the controller 402 permits the portal server 300 to access the external server 400. The controller 402 can control writing of data and reading of data to and from the storage region of the HDD 404, that is related to the external server account information, in accordance with a request from the portal server 300 that is permitted to access the external server 400.

The HDD 404 stores information 311 (hereinafter, referred to as "external server basic information") indicating a style of image data that can be accepted (handled) by the external server 400. The external server basic information 311 will be described in detail later.

2-4. Configuration of External Server Information

The configuration of the external server information 310 will be described with reference to FIG. 5. Regardless of presence or absence of external server account information, the portal server 300 stores the external server information 310 concerning all external servers 400 to which transmission from the portal server 300 is assumed. When plural external servers 400 are present, the external server information 310 concerning each external server 400 is stored into the portal server 300.

The digital camera 100 receives the external server information 310 from the portal server 300, and displays information based on the external server information 310 as reference information on the liquid-crystal monitor 123. With this configuration, the user can refer to the external server information 310 when selecting the external server 400 as a transmission destination and image data to be transmitted.

The external server information 310 is configured by the external server basic information 311 and the external server recommendation information 312.

The external server basic information 311 includes logo mark information indicating the external server 400, and information indicating a constraint condition of image data that the external server 400 can accept.

When a size of image data transmitted by the portal server 300 is larger than a size of image data that the external server 400 can accept, for example, an error occurs. This error causes a problem that the image data cannot be uploaded to the external server 400.

To avoid such a problem, the digital camera 100 acquires the external server basic information 311 from the portal server 300, and performs a process based on the external server basic information 311. In this way, the problem that the image data cannot be uploaded to the external server 400 can be avoided.

The portal server 300 is periodically connected to the external server 400 to acquire the external server basic information 311 and to update the external server basic information 311 in the HDD 304.

The external server basic information 311 specifically includes (1) logo mark image data, and as constraint conditions (2) a supported image format, (3) a maximum upload size, (4) the maximum upload number of pixels, (5) a maximum upload bit rate, etc.

(1) The logo mark image data is logo mark data for visually discriminating the external server 400. A logo mark may be a mark that represents a service (an image sharing service or the like) provided by the external server 400. When the external server 400 as the upload destination is selected, the digital camera 100 can display the logo mark of the external server 400 on the liquid-crystal monitor 123.

(2) The supported image format is information indicating a file format of image data that can be accepted by the external server 400 (that is, a file format of image data that can be uploaded). The supported image format is JPEG, PNG (Portable Network Graphics) and the like for a still image, and MPEG2, MPEG4, and the like for a moving image. The supported image format may be information indicating not only a file format but also a coding format of the image data.

(3) The maximum upload size is information indicating a maximum file size that can be accepted by the external server 400 (that is, a maximum file size that can be uploaded). The maximum upload size may be set separately for each of the still image and the moving image.

(4) The maximum upload number of pixels is information indicating maximum numbers of pixels that can be accepted by the external server 400 (that is, maximum numbers of pixels that can be uploaded). The maximum number of pixels is expressed by (the number of vertical pixels)×(the number of horizontal pixels). When both of the number of vertical pixels and the number of horizontal pixels of an image transmitted to the external server 400 are equal to or smaller than values indicated by the maximum upload number of pixels, the external server 400 decides that the image regarding the numbers of pixels can be accepted. The maximum upload number of pixels is particularly used when a limit concerning the numbers of vertical and horizontal pixels of image data that is uploaded to the external server 400 is necessary.

(5) The maximum upload bit rate is information indicating a maximum bit rate of a moving image that can be accepted by the external server 400 (that is, a maximum bit rate that can be uploaded). The maximum upload bit rate is applied to only a content of the moving image.

The external server recommendation information 312 is information indicating a style (a format, a size and/or so on) of the image data, recommended by the portal server 300. The external server recommendation information 312 specifically includes (a) a recommended image format, (b) a recommended upload size, (c) recommended upload number of pixels, (d) a recommended upload bit rate, etc.

(a) The recommended image format is a format that is selected from file formats indicated by the supported image format of the external server basic information 311.

(b) The recommended upload size is set to be equal to or smaller than a file size indicated by the maximum upload size of the external server basic information 311. The recommended upload size is calculated based on a predetermined method by the portal server 300 from the file size indicated by the maximum upload size of the external server basic information 311.

(c) The recommended upload number of pixels is set such that the recommended number of vertical pixels becomes equal to or smaller than the maximum number of vertical pixels of the external server basic information 311 and that the recommended number of horizontal pixels becomes equal to or smaller than the maximum number of horizontal pixels. The recommended upload number of pixels is calculated in a predetermined method by the portal server 300, from the number of pixels indicated by the maximum upload number of pixels of the external server basic information 311. The recommended upload number of pixels is expressed by (the number of vertical pixels)×(the number of horizontal pixels).

(d) The recommended upload bit rate is set to be equal to or lower than a bit rate indicated by the maximum upload bit rate. The recommended upload bit rate is calculated in a predetermined method by the portal server 300, from the bit rate indicated by the maximum upload bit rate of the external server basic information 311.

The external server recommendation information 312 is different from the external server basic information 311 in that the external server recommendation information 312 is not the constraint condition of image data to be satisfied when the digital camera 100 transmits the image data to the portal server 300. Therefore, the user is not necessarily required to follow the condition prescribed by the external server recommendation information 312.

The external server recommendation information 312 is generated as follows, for example. As described above, the portal server 300 acquires the external server basic information 311 from the external server 400 at each predetermined period. Then, the portal server 300 determines one condition that the portal server 300 recommends to the digital camera 100, within a range in which the condition specified by the external server basic information 311 is satisfied. For example, the recommended upload size is determined as 70% of the maximum upload size.

The external server recommendation information 312 is not necessarily generated by the portal server 300. For example, a person in charge of the portal server 300, or the like may determine the external server recommendation information 312 in consideration of a usage scene of service that is provided by the external server 400 and the external server basic information 311. In this case, the determined external server recommendation information 312 is recorded into the HDD 304 of the portal server 300 by the person in charge or the like.

Advantages of transmission of the external server basic information 311 to the digital camera 100 are as follows. When the portal server 300 transmits image to the external server 400, an error may occur because the size of the image is larger than the size that the external server 400 can accept. In this case, the user needs to retransmit the image to the portal server 300, resulting in inconvenience. Such inconvenience can be improved by the external server recommendation information 312. That is, when the digital camera 100 transmits the image to the portal server 300, making the size of the image small based on the external server recommendation information 312 allows an error occurring when the portal server 300 transmits the image to the external server 400 to be prevented.

Advantages of transmission of the external server recommendation information 312 to the digital camera 100 are as follows. When a communication device (the digital camera 100 in the present embodiment) is a mobile terminal, the communication device consumes a battery to transmit image data. In many cases, in the digital camera 100, an image may be shot with the maximum size of sizes that can be set in the camera. Considering a usage scene of the image data after the image data is transmitted to the external server 400, in many cases, a size of the transmitted image data is not required to be a size of a high-resolution image that can be taken by the present digital camera 100. By taking such a situation into account, the digital camera 100 of the present embodiment can convert a style (an attribute) such as a size of an image, the number of pixels, and/or a format of the image data into a style preferred for the usage scene, by acquiring and referring to the recommendation information. In this way, the digital camera 100 can minimize a transmission data size and can reduce an image transmission time. Accordingly, an energy saving effect in transmitting the image by the communication device can be expected.

3. Operations of Digital Camera, Portal Server, and External Server

In the digital camera 100, portal server account information needs to be stored in the flash memory 142 before the operation of uploading an image to the portal server 300. The portal server account information is entered through a GUI displayed on the liquid-crystal monitor 123 of the digital camera 100. The portal server account information that entered into the digital camera 100 is composed of a login ID and a password, for example.

Figure 6:
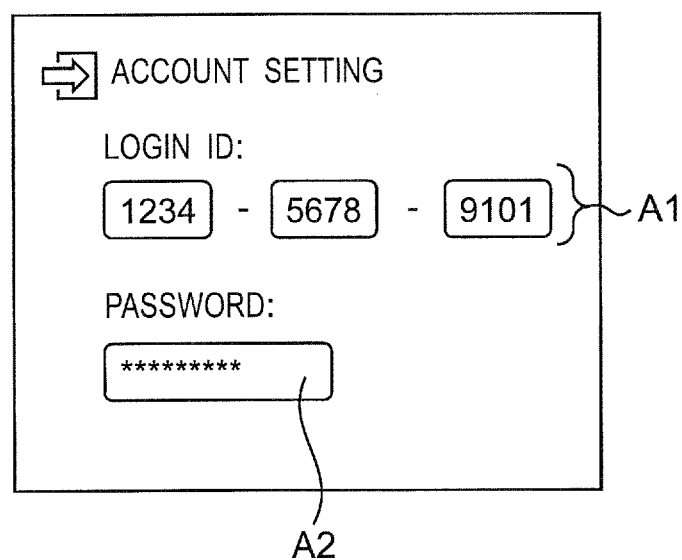
FIG. 6 is a diagram showing a GUI for inputting portal server account information to the digital camera.

FIG. 6 shows an example of an input screen of the portal server account information. A region A1 is a region in which a login ID is input when the digital camera 100 accesses the portal server 300. A region A2 is a region in which a password is input when the digital camera 100 accesses the portal server 300.

In the digital camera 100, a method of a conversion (conversion process) which the digital camera 100 performs to image data is set before the operation of uploading the image to the portal server 300.

The external server account information corresponding to the external server 400 as an upload destination is related to the portal server account information within the HDD 304 of the portal server 300, prior to the operation of uploading an image to the portal server 300.

Figure 7:
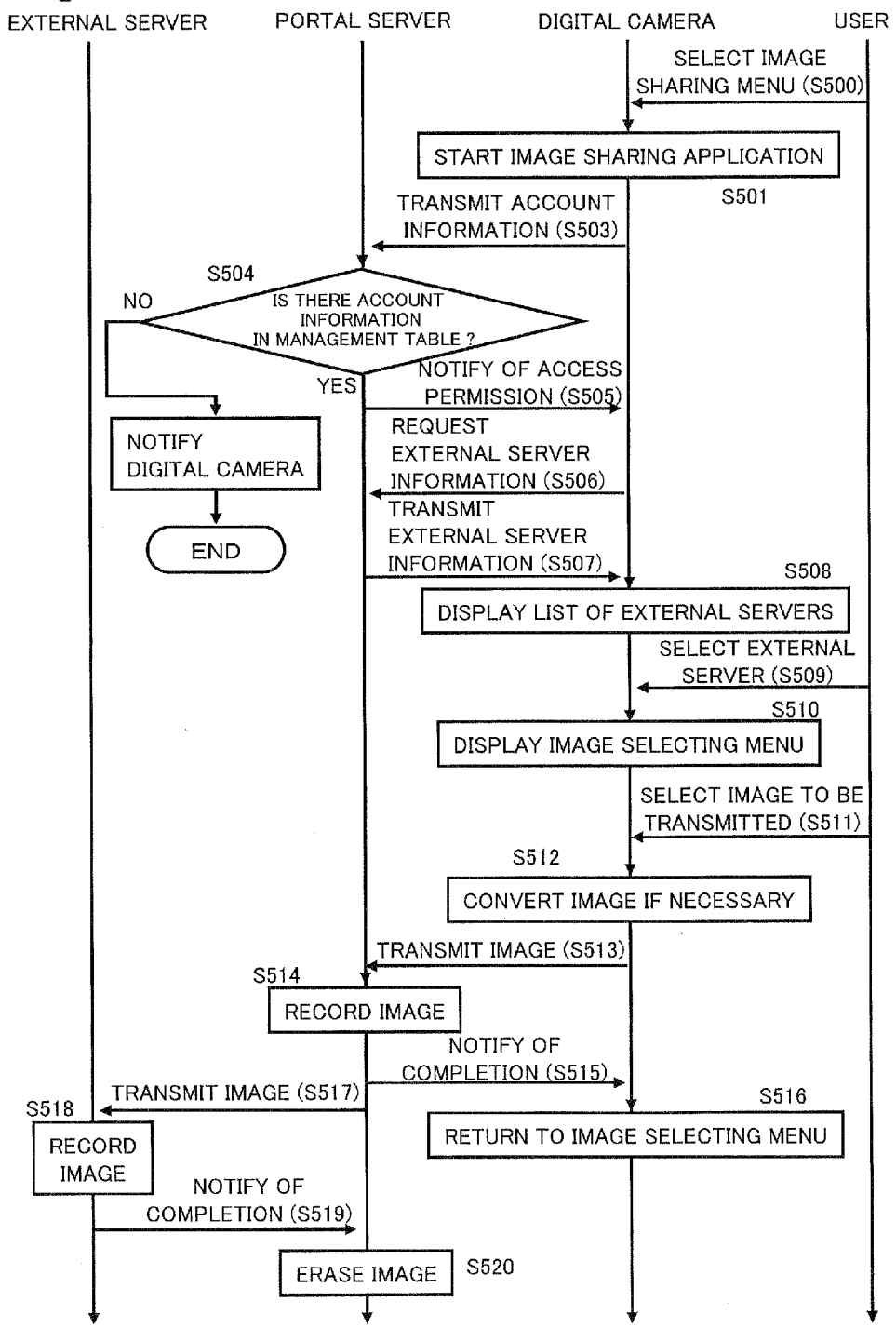
FIG. 7 is a sequence chart for describing operation flows of the digital camera, the portal server, and the external server according to the present embodiment.

With reference to FIG. 7, operations of the digital camera 100, the portal server 300, and the external server 400 performed when uploading an image from the digital camera 100 to the external server 400 via the portal server 300 will be described.

When the digital camera 100 receives an indication that the user selects an image sharing menu (S500), the controller 130 of the digital camera 100 reads an image sharing application from the flash memory 142 and starts the application (S501). The image sharing application is an application for enabling the digital camera 100 to transmit image data to the external server 400 via the portal server 300. The image sharing application causes various functions relevant to image sharing to be executed.

Start of the image sharing application is specifically performed in the following procedures. In accordance with the user operation, the digital camera 100 first displays a menu screen that presents a list of functions on the liquid-crystal monitor 123. In accordance with the user operation received by the operating unit 150, an image sharing menu is selected from the plurality of functions displayed on the menu screen. When the operating unit 150 receives the menu determination operation with the image sharing menu being selected, the controller 130 of the digital camera 100 reads and starts the image sharing application stored in the flash memory 142.

When the image sharing application is started, the controller 130 transmits the portal server account information stored in the flash memory 142 to the portal server 300 through the communicating unit 171 (S503).

The communicating unit 301 of the portal server 300 receives the portal server account information transmitted by the digital camera 100. Then, the controller 302 of the portal server 300 determines whether the received portal server account information is present in the portal server account information management table in the HDD 304 or not (S504).

When the controller 302 determines that the received portal server account information is not present in the portal server account information management table (NO in step S504), the portal server 300 notifies the digital camera 100 that the received portal server account information is not present in the portal server account information management table. When the digital camera 100 receives this notification, the digital camera 100 presents the user with information about a failure of connection to the portal server 300 on the liquid-crystal monitor 123, and then finishes the image sharing application. In this case, the user can retry the login to the portal server 300, by setting again the portal server account information with the GUI shown in FIG. 6, or by generating a new account in the portal server 300.

When the controller 302 determines that the received portal server account information is present in the server account information management table (YES in step S504), the controller 302 notifies the digital camera 100 that the controller 302 permits the digital camera 100 to access a storage region on the HDD 304 that is related to the portal server account information (S505).

When the controller 130 of the digital camera 100 receives notification of access permission from the portal server 300, the controller 130 requests the external server information 310 from the portal server 300 (S506). The controller 302 of the portal server 300 sends back to the digital camera 100 all external server information 310 (that is, the external server information 310 corresponding to all external servers 400 to which the portal server 300 is assumed to transmit image data) stored in the portal server 300, in response to the request for the external server information 310 (S507). At this time, the controller 302 of the portal server 300 transmits to the digital camera 100, transmission possibility information indicating whether the digital camera 100 can actually transmit to the portal server 300 or not together with the external server information 310.

Figure 8:
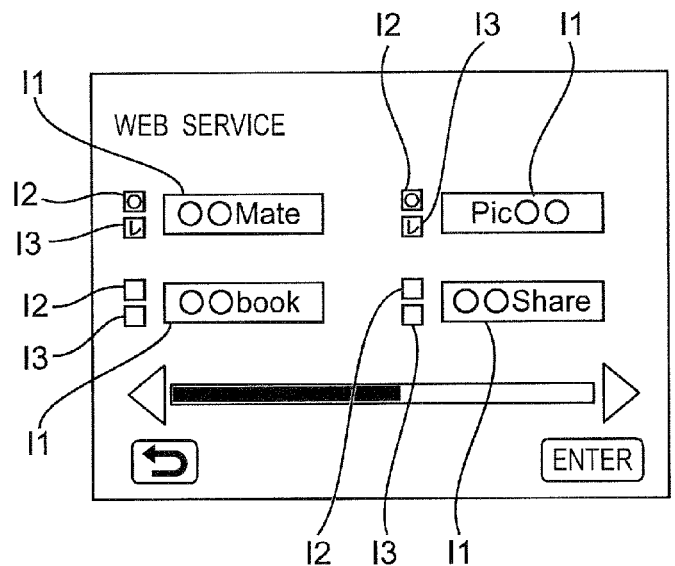
FIG. 8 is a diagram showing a GUI used for selecting the external server.

When the controller 130 of the digital camera 100 receives the external server information 310 and the transmission possibility information, the controller 130 extracts logo-mark image data from the external server information 310 and displays an image based on the logo mark and the transmission possibility information on the liquid-crystal monitor 123 (S508). That is, after the image sharing application is started, when the portal server account information of the digital camera 100 is in the portal server, the liquid-crystal monitor 123 displays a GUI as shown in FIG. 8, for example. The controller 130 displays, in a pair, a logo mark I1 and an image I2 based on the transmission possibility information, for each external server 400. The image I2 based on the transmission possibility information is displayed in relation to the logo mark I1, as information indicating whether the image can be uploaded to the corresponding external server 400. That is, the GUI presents the user with information that the digital camera 100 can upload the image to the external server 400 by displaying a "○" mark to the external server 400 to which the data can be transmitted.

The transmission possibility information may be presented by changing a color or the like of the logo mark. For example, a logo mark of an external server of which transmission possibility information is "possible" may be presented in color, while a logo mark of an external server of which transmission possibility information is "impossible" may be presented in black and white.

Because the transmission possibility information is displayed on the liquid-crystal monitor 123, the user can confirm all external servers 400 to which data can be transmitted. The user selects the external server 400 as a transmission destination by operating the operating unit 150 of the digital camera 100 (S509). The GUI displays a check mark in a selection column I3 of the selected external server 400.

Figure 9:
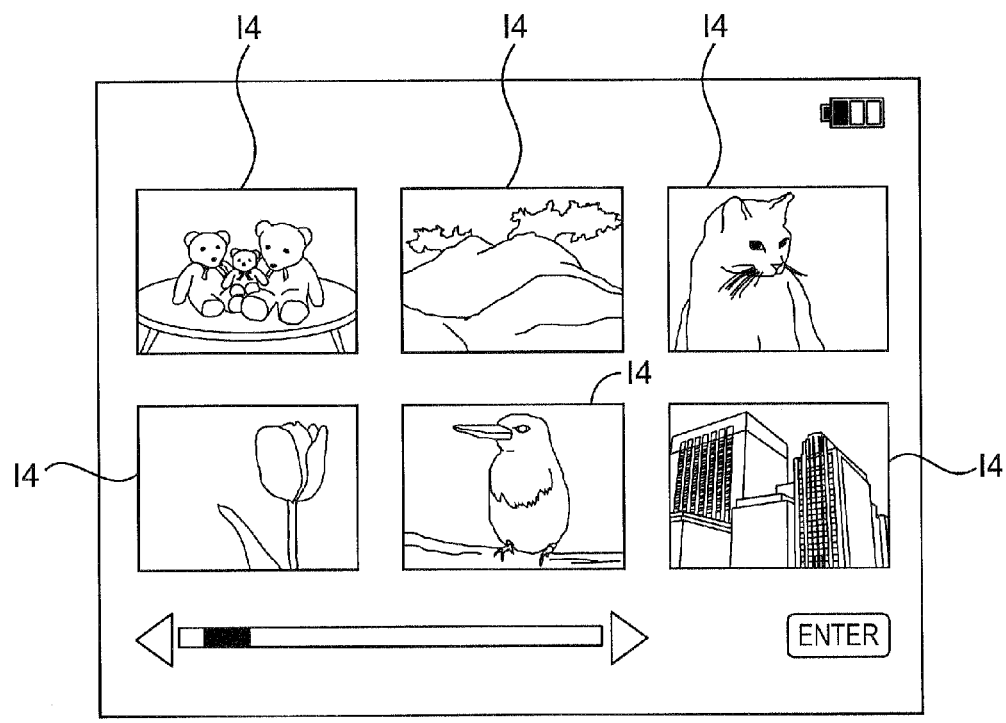
FIG. 9 is a diagram showing a GUI used for selecting an image.

Next, the liquid-crystal monitor 123 displays an image based on image data stored in the flash memory 142 or the memory card 141 (S510). At this time, a GUI (a image selecting menu) shown in FIG. 9 is displayed, for example. An image I4 is an image based on the image data stored in the flash memory 142 or the memory card 141. Based on selection of the image I4 displayed in the liquid-crystal monitor 123, image data to be transmitted to the portal server 300 is selected. Based on the image displayed in the liquid-crystal monitor 123, the user selects image data that the user wants to transmit to the portal server 300 by operating the operating unit 150 (S511).

The GUI shown in FIG. 9 may display the image based on the image data one by one, or simultaneously display a plurality of images in a thumbnail list. Only one image may be selected, or a plurality of images may be selected. An image may be selected in each image data or in each folder.

The operation (S510 to S511) for selecting an image to be transmitted may also be performed before the operation for selecting the external server 400 (S508 to S509).

When image data to be transmitted is determined, the controller 130 of the digital camera 100 refers to the external server information 310 as necessary, in accordance with the conversion method of the image data that is set in advance. Then, the controller 130 compares the selected image data with the constraint condition and/or the recommendation information which are indicated by the external server information 310 corresponding to the external server 400 as a transmission destination. Then, the controller 130 instructs the image processor 122 to convert the image data, based on the result of comparison. The image processor 122 applies a conversion process for an upload that is set in advance, to the image data to be transmitted (S512).

Figure 10:
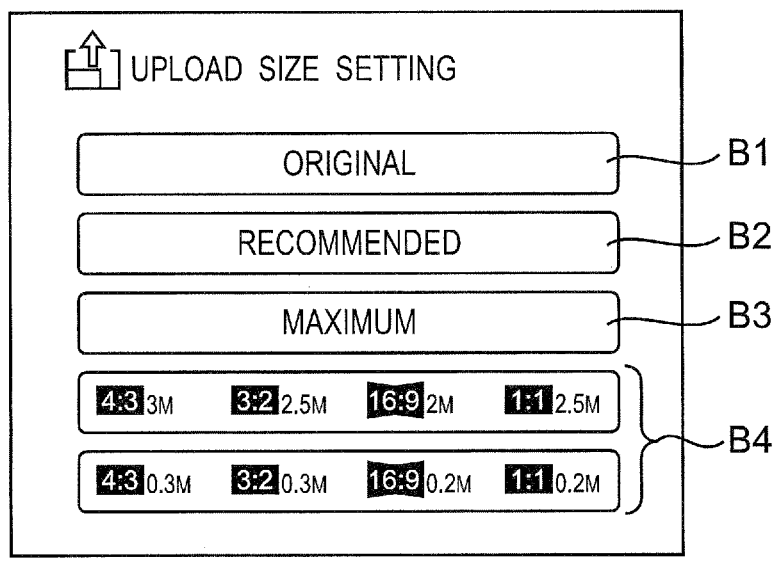
FIG. 10 is a diagram showing a GUI for setting image conversion at an image transmission time.

The setting of the conversion process for upload will be described below. FIG. 10 shows a GUI that is displayed on the liquid-crystal monitor 123 to enable the user to set the conversion process of the image data for upload. This GUI includes an "ORIGINAL" button B1, a "RECOMMENDED" button B2, a "MAXIMUM" button B3, and a setting region B4 for specifying a conversion size.

The "ORIGINAL" button B1 is a button to set transmission of the image data stored in the flash memory 142 and/or the memory card 141 to the portal server 300 by keeping the style (the attribute) of the image data as it is, without converting the image data. The "RECOMMENDED" button B2 is a button to set transmission of the image data after converting the image data into a style indicated by the recommendation information (the external server recommendation information 312) acquired from the portal server 300. The "MAXIMUM" button B3 is a button to set transmission of the image data after converting the image data into a style indicated by the constraint condition (the external server basic information 311) acquired from the portal server 300. The setting region B4 for specifying a conversion size is a region to set transmission of the image data after converting the image data into a style specified by the user. The setting region B4 for specifying a conversion size includes a plurality of regions to set different sizes of an image and different sizes of image data.

By using the buttons B1 to B3 and the setting region B4, the user can set in advance a conversion process to be performed to the image data at the upload time, from the following four conversion processes. That is, the user can set a conversion process from the following four options.

(1) Not converting the image data.
(2) Converting the image data into a style indicated by the recommendation information (the external server recommendation information 312) acquired from the portal server 300.
(3) Converting the image data into a style indicated by the constraint condition (the external server basic information 311) acquired from the portal server 300.
(4) Converting the image data into a user-specified size.

The option (1) is set by selecting the "ORIGINAL" button B1. The option (2) is set by selecting the "RECOMMENDED" button B2. The option (3) is set by selecting the "MAXIMUM" button B3. The option (4) is set by using the setting region B4 for specifying a conversion size. When the option (4) is set, following this setting, a conversion style (a size of an image, a size of image data, or the like) of the image data is set by the user.

The conversion of the image data includes conversions of a format of an image, a data size of the image, the number of pixels of the image, a bit rate of the image, and the like.

The setting region B4 for assigning a conversion size may include a button for specifying a format of the image data. The setting region B4 may also be configured such that the user can input an arbitrary value in the setting region B4, for example.

In the GUI shown in FIG. 10, when the "ORIGINAL" (button B1) is selected in advance, that is, when the option of "(1) Not converting the image data" is selected in advance as a conversion process for upload, the controller 130 transmits the image data to the portal server 300 without performing the conversion process to the image data. In this case, depending on the external server 400 as a transmission destination, the external server 400 may not accept image data when the image data is transmitted from the portal server 300 to the external server 400 later.

In a case where the option of "(1) Not converting the image data" is selected in advance as the conversion process for upload, when the digital camera 100 refers to the external server basic information 311 corresponding to the external server 400 as the transmission destination, and finds that the selected image data does not satisfy the constraint condition indicated by the external server basic information 311, the digital camera 100 may notify the user that the external server 400 as the transmission destination cannot accept the selected image data. Alternatively, before (or when) the portal server 300 transmits the image data to the external server 400, when the portal server 300 refers to the external server basic information 311 and finds that the image data does not satisfy the constraint condition indicated by the external server basic information 311, the portal server 300 may transmit to the user the information indicating that the external server 400 cannot accept the image data. Then, the digital camera 100 may present the user with information that the external server 400 cannot accept the selected image data, based on the transmitted information.

In the GUI shown in FIG. 10, when the "RECOMMENDED" (button B2) is selected in advance, that is, when the option of "(2) Converting the image data into a style indicated by the recommendation information acquired from the portal server 300" is selected in advance as a conversion process at the upload time, the controller 130 controls the image processor 122 to convert the selected image data in accordance with the external server recommendation information 312 corresponding to the selected external server 400. The image processor 122 converts the style of the selected image data into a style of image data indicated by the external server recommendation information 312.

That is, the style of the selected image data is converted to satisfy all of the recommended image format, the recommended upload size, the recommended number of pixels for upload, and the recommended upload bit rate. For example, consider a case where the number of vertical pixels of the selected image data is equal to or smaller than the number of vertical pixels of the recommended number of pixels for upload, and the number of horizontal pixels of the selected image data is larger than the number of horizontal pixels of the recommended number of pixels for upload. In this case, the selected image data is reduced such that the number of horizontal pixels of the image data becomes equal to the number of horizontal pixels of the recommended number of pixels for upload while maintaining an aspect ratio (a horizontal to vertical ratio) of the image data.

In the GUI shown in FIG. 10, when the "MAXIMUM" (button B3) is selected in advance, that is, when the option of "(3) Converting the image data into a style indicated by the external server basic information 311 acquired from the portal server 300" is selected in advance as a conversion process for upload, the controller 130 controls the image processor 122 to convert the selected image data, in accordance with the external server basic information 311 corresponding to the selected external server 400. The image processor 122 converts the style of the selected image data into a style of image data indicated by the external server basic information 311.

That is, the style of the selected image data is converted to satisfy all of the supported image format, the maximum upload size, the maximum numbers of pixels for upload, and the maximum upload bit rate. For example, consider a case where the number of vertical pixels of the selected image data is equal to or smaller than the maximum number of vertical pixels for upload, and the number of horizontal pixels of the selected image data is larger than the maximum number of horizontal pixels for upload. In this case, the selected image data is reduced such that the number of horizontal pixels of the image data becomes equal to the maximum number of horizontal pixels for upload while maintaining the aspect ratio of the image data.

In the GUI shown in FIG. 10, when the size and the like of the image data are set in advance with the setting region B4, that is, when the option of "(4) Converting the image data into a specified size" is selected in advance as a conversion process for upload, the image processor 122 converts the selected image data into the specified size that is set in advance by the user.

The image data converted into the specified size may not be uploaded in some cases, depending on a constraint condition of the external server 400 as an upload destination. To avoid this case, before the image data is converted, the digital camera 100 may compare a specified size with a size indicated by the external server basic information 311. When the specified size is larger than the size indicated by the external server basic information 311, the digital camera 100 may notify the user that the external server 400 as a transmission destination cannot accept the transmitted image data. Alternatively, before (or when) the portal server 300 transmits the image data to the external server 400, when the portal server 300 refers to the external server basic information 311, and determines that the image data does not satisfy the constraint condition indicated by the external server basic information 311, the portal server 300 may present to the user information indicating that the external server 400 cannot accept the image data, by transmitting the information to the digital camera 100.

In the present embodiment, the setting of the conversion process for upload is selected before the image sharing application is started. However, the conversion process for upload may be set after selection of the external server 400 as a transmission destination (S508) and after selection of the image data to be transmitted (S510). In this case, the GUI shown in FIG. 10 is displayed on the liquid-crystal monitor 123 after selection of the external server 400 as a transmission destination and after selection of the image data to be transmitted. In this case, the specified size indicated in the setting region B4 may be changed depending on the external server 400 as the transmission destination.

After any one of the above conversion processes, the controller 130 of the digital camera 100 collectively transmits the selected image data to the portal server 300 (S513). At this time, the controller 130 transmits information indicating the external server 400 as a final transmission destination of the transmitted image data with the information related to the image data. The external server as a final transmission destination is the external server selected in the GUI shown in FIG. 8.

Figure 11:
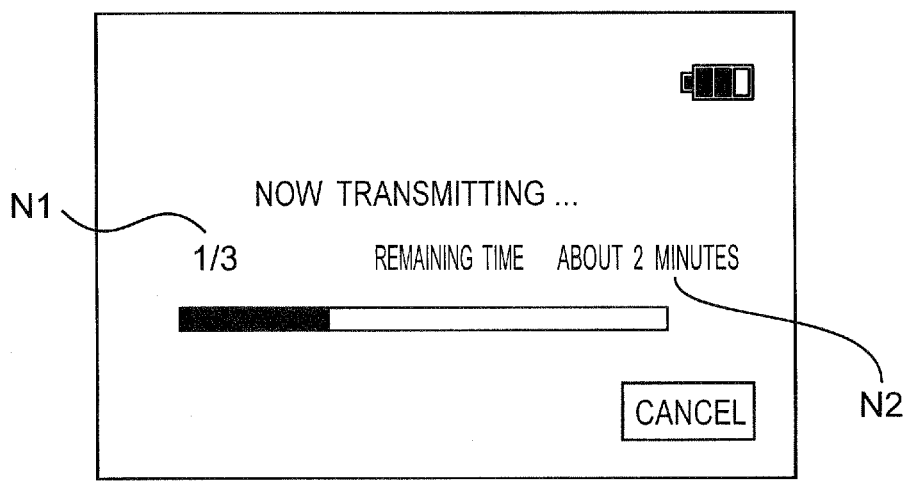
FIG. 11 is a diagram showing a GUI at an image transmission time.

While the image data is being transmitted from the digital camera 100 to the portal server 300, the liquid-crystal monitor 123 displays a GUI to notify the user that the image data is being transmitted. An example of this GUI is shown in FIG. 11. This GUI indicates the number N1 of transmitted image data out of the total number of the image data to be transmitted, and a remaining time N2 that is required to complete the transmission of all image data. From this GUI, the user can understand that the image data is being transmitted.

When the controller 302 of the portal server 300 receives the image data from the digital camera 100, the controller 302 records the received image data into the storage region on the HDD 304 that is related to the portal server account information previously received from the digital camera 100 (S514).

At this time, the controller 302 records the received image data into the HDD 304 with the received image data related to the portal server account information and the information indicating the external server 400 as the transmission destination, which are set when the image data is uploaded from the digital camera 100. The controller 302 refers to the information when transmitting later the received image data to the external server 400.

The portal server 300 completes the recording of the image data received from the digital camera 100, and then notifies the digital camera 100 that the reception of the image data from the digital camera 100 is completed (S515).

When the controller 130 of the digital camera 100 receives the notification of the reception completion from the portal server 300, the controller 130 displays again the GUI (the image selecting menu, see FIG. 9) for selecting image data to be transmitted on the liquid-crystal monitor 123 (S516). The digital camera 100 can enables the user to continuously transmit the image stored in the flash memory 142 and/or the memory card 141 to the portal server 300, by displaying again the GUI for selection of a transmission image after completing transmission of the image data.

On the other hand, the controller 302 of the portal server 300 notifies the digital camera 100 that recording of the image data is completed, and then the controller 302 shifts to an operation of periodically transmitting the image data recorded in the HDD 304 to the external server 400.

The image data to be transmitted to the external server 400 is stored in the HDD 304 in advance, with the image data to related to the portal server account information used to upload the image data from the digital camera 100 and the information indicating the external server 400 as a transmission destination.

The controller 302 reads the external server account information related to the portal server account information, from the HDD 304. Then, the controller 302 connects to the external server 400 that is specified as a transmission destination of the image data, by using the read external server account information. After the controller 302 connects to the external server 400, the controller 302 transmits the image data to the external server 400. The controller 302 similarly transmits, to the external server 400, all image data that are not transmitted yet to the external server 400 (S517).

The controller 402 of the external server 400 records the image data received from the portal server 300, into the storage region on the HDD 404 that is related to the external server account information used when the portal server 300 connects to the external server 400 (S518).

After completing recording of the image data, the controller 402 notifies the portal server 300 that the recording of the image data is completed (S519).

Notification of completion to the portal server 300 may include an URL and the like of the external server 400 to which the image data is transmitted. When receiving the notification of completion, the controller 302 of the portal server 300 records the notification of completion into the HDD 304, while relating the notification of completion to a date and time of reception of the notification of completion and the portal server account information of the digital camera 100 that transmits the image data corresponding to the notification of completion.

When the user separately accesses the portal server 300 with a web browser from a personal computer or the like, the portal server 300 can notify the user that transmission of the image data to the external server 400 is completed, based on the notification of completion recorded in the HDD 304 of the portal server 300.

Alternatively, when the portal server 300 has an e-mail sending function, the portal server 300 may store or register a mail address of the user of the digital camera 100 while relating the mail address to the portal server account information, and may transmit an e-mail containing the notification of completion to the registered mail address.

Alternatively, when the digital camera 100 next logs into the portal server 300, the portal server 300 may notify the digital camera 100 of completion of a transmission (or uploading) of the image data to the external server 400, based on the notification of completion stored in the HDD 304.

When receiving notification of transmission completion of the image data from the external server 400, the controller 302 of the portal server 300 erases the image data stored in the HDD 304 (S520).

In the present embodiment, the portal server 300 notifies the digital camera 100 of reception completion of the image data from the digital camera 100 before the image data received from the digital camera 100 is transmitted to the external server 400 (S515). However, this configuration is not necessarily required. The portal server 300 may notify the digital camera 100 of reception completion of the image data, when receiving notification of completion from the external server 400 (S519). In this way, the digital camera 100 can notify the user in real time that the transmission to the external server 400 as a final transmission destination is completed. However, in this case, the portal server 300 transmits the image data received from the digital camera 100, to the external server 400, not in a predetermined cycle but in a short time as much as possible. In this way, a waiting time required for the digital camera 100 to receive the notification of transmission completion of the image data can be shortened. Therefore, power consumption by the digital camera 100 during the waiting time can be reduced.

In the present embodiment, when receiving the notification of transmission completion of the image data from the external server 400, the controller 302 of the portal server 300 erases the image data stored in the HDD 304 (S520). However, the portal server 300 may keep storing the image data without erasing the image data.

As described above, according to the present embodiment, the digital camera 100 can acquire the constraint condition and the recommendation information of the external server 400, by accessing the portal server 300.

In this way, a communication device such as the digital camera 100 can convert the image data into a style (a constraint condition) of the image data that is acceptable to the external server 400, before transmitting the image data to the external server 400 via the portal server 300. Therefore, an error occurring when the image data is transmitted from the portal server 300 to the external server 400 can be reduced.

Further the digital camera 100 can convert the style of the image data in accordance with the external server recommendation information 312 before transmitting the image data. Thus the size of the image data can be set to a size that is suitable for a service provided by the external server 400. In this way, power consumption and a transmission time of the digital camera 100 in transmitting of the image data can be reduced while keeping the style of the image data in the style required for the provided service.

As described above, according to the present embodiment, convenience in transmitting the image data to the external server 400 via the portal server 300 is improved from prior art.

In some cases, the external server 400 may determine a constraint condition by taking into account transmitting of the image data by a personal computer via a wired LAN. In this case, for example, the external server 400 may allow a constraint condition that the image data having a very large number of pixels can be transmitted. However, when a communication device such as the digital camera 100 transmits the image data via a wireless LAN having a lower speed than that of a wired LAN, transmission of the image data that satisfies such a constraint condition causes a problem in that a transmission time becomes longer than the transmission via the wired LAN due to a large data quantity. To solve such a problem, the external server recommendation information 312 may be determined in view of transmitting of the image data via the wireless LAN. For example, the recommended upload size may be determined to a value that causes the transmission time to be reduced as much as possible even when the image data is transmitted via the wireless LAN. By referring to the external server recommendation information 312 set in this way before uploading the image data the digital camera 100 can convert a data quantity of the transmitted image data into a size suitable for the image data transmitted via the wireless LAN. In this way, a transmission time can get shorter than that required when the image data of a large size before the conversion is transmitted. Consequently, power consumption of the digital camera 100 can be reduced.

Reduction in power consumption of the digital camera 100 in transmitting the image data enables an operation time of the digital camera 100 and the number of picked-up images to be increased. Consequently, convenience of the digital camera 100 is further improved as compared to the case where the image data of a large size before the conversion is transmitted.

4. Conclusion of Present Embodiment

As described above, the digital camera 100 of the present embodiment can transmit data via the portal server 300 to the external server 400. The digital camera 100 includes the communicating unit 171 that acquires, from the portal server 300, the external server information 310 as information indicating a style of data acceptable to the external server 400, the image processor 122 that converts a style of data to be transmitted into the style acceptable to the external server 400, based on the external server information 310, and the communicating unit 171 that transmits the data converted by the image processor 122 to the portal server 300.

The portal server 300 of the present embodiment can receive the data from the digital camera 100, and transmit the received data to the external server 400. The portal server 300 includes the communicating unit 301 that acquires, from the external server 400, the external server information 310 as information indicating a style of the data acceptable to the external server 400, and the communicating unit 301 that transmits the external server information 310 to the digital camera 100.

According to the digital camera 100 and the portal server 300 having the above configurations, the digital camera 100 can convert the style of the image data into the style that the external server 400 can accept before the digital camera 100 transmits the image data to the portal server 300. Therefore, an error occurring when the image data is transmitted from the portal server 300 to the external server 400 can be avoided. In this way, a workload, time and power consumption in transmission of the image data to the portal server 300 can be reduced than those of prior art.

The digital camera 100 converts the style of the image data into a style indicated by the external server recommendation information 312 contained in the external server information 310, so that a size of the image data can be set at a size suitable for a service provided by the external server 400. In this way, power consumption and a time required by the digital camera 100 when transmitting the image data to the portal server 300 can be reduced from those required when transmitting the image data before the conversion to the portal server 300.

5. Other Embodiments

The embodiment is not limited to the aforementioned embodiment. The idea of the above embodiment can also be applied to another embodiment obtained by suitably applying a change, replacement, addition, and/or omission to the above embodiment. The other embodiments to which the idea of the above embodiment can be applied will be described below.

The above embodiment describes a system that transmits image data with the portal server 300 and the digital camera 100 being connected to each other. For example, a case where the digital camera 100 is connected to the portal server 300 via an indoor access point is considered. However, when the digital camera 100 is located outside or the like, the communicating unit 171 of the digital camera 100 may not be connected to the portal server 300. In such a situation, the digital camera 100 may transmit the image data to the portal server 300 via a mobile device (a smart phone or the like) connectable to a mobile telephone network.

When the digital camera 100 transmits the image data to the portal server 300 via the mobile device, the mobile device may further perform the following operations. Before the digital camera 100 transmits the image data to the mobile device, the mobile device acquires in advance the external server information 310 from the portal server 300, and stores the external server information 310 while relating the external server information 310 to a date and time of acquisition of the external server information 310. When the digital camera 100 accesses the mobile device, the digital camera 100 receives the external server information 310 stored in advance, from the mobile device. The digital camera 100 enables the user to select the external server 400 as a transmission destination of image data and the image data to be transmitted, based on the external server information 310 received from the mobile device. Further, the digital camera 100 converts the style of the image data as necessary in accordance with the external server basic information 311 or the external server recommendation information 312 contained in the external server information 310. The digital camera 100 transmits the selected image data to the mobile device. When the mobile device next enters a region in which the mobile device can connect to the communication line 200, the mobile device transmits the image data received from the digital camera 100, to the portal server 300. Thereafter, the portal server 300 transmits the image data to the external server 400 in a manner similar to the operation in the above embodiment.

According to the configuration having intermediacy of a mobile device, even when the digital camera 100 cannot directly connect to the portal server 300 because the mobile device is outside the range of the mobile telephone network, the mobile device can be set, at a desired timing, to allow the image data to be transmitted to the portal server 300. That is, the mobile device is a substitution of the portal server 300 in the above embodiment.

However, when the mobile device is used as a substitution of the portal server 300, the mobile device may be outside the range of the mobile telephone line in some cases, and thus the mobile device cannot always acquire the latest external server information 310 from the portal server 300. Therefore, in this case, there is a problem in that the external server information 310 in the mobile device may be information older than the external server information 310 within the portal server 300.

To solve this problem, the digital camera 100 preferably records in advance the external server information 310 which is acquired by the digital camera 100 when the digital camera 100 is connected to the portal server 300 last time, into the flash memory 142 or the like, while relating the external server information 310 to the date and time of acquisition of the external server information 310. Then, when the digital camera 100 transmits the image data to the portal server 300 via the mobile device, the digital camera 100 compares the external server information 310 in the flash memory 142 with the external server information 310 in the mobile device, and refers to the recent external server information 310. In this way, the digital camera 100 can operate based on the more recent external server information 310, in comparison with the case of referring to only the external server information 310 in either one of the digital camera 100 and the mobile device.

The portal server 300 of the above embodiment simultaneously transmits, to the digital camera 100, the external server basic information 311 and the external server recommendation information 312, which are included in the external server information 310. However, other embodiments may also be adopted. For example, the external server basic information 311 and the external server recommendation information 312 may be separately transmitted from the portal server 300 to the digital camera 100.

In the above embodiment, the digital camera is exemplified as the communication device. However, the idea of the above embodiment is not limited thereto. A device that can transmit data to the portal server 300 is can be applied with the idea of the above embodiment. For example, the idea of the above embodiment can also be applied to a communication device that can transmit, for example, audio data, character data, content data, and/or the other data, to the portal server 300.

The embodiment has been described as an example of the art in the present disclosure. For this purpose, the detailed description and the accompanying drawings have been disclosed. Thus the elements described in the detailed description and the accompanying drawings may include elements that are not essential to solve the problems and should not be considered as limiting the scope of the embodiments recited in the claims.

The above embodiment is provided to exemplify the art in the present disclosure. Therefore, the above embodiment can be subject to various modifications, replacements, additions, omissions, and/or the like within scopes of claims and their equivalents.

INDUSTRIAL APPLICABILITY

The present embodiment can be applied to a device (a movie camera, a smart phone, or the like) or a communication system which transmits data to a target server via a relay server.

What is claimed is:

1. A communication device for transmitting data via a first server to a second server, comprising:
   an acquiring unit operable to acquire, from the first server, server information as information indicating styles of data acceptable to the second server, the server information being configured by server basic information as information indicating constraint conditions of data to be satisfied in order to be acceptable to the second server and server recommendation information as information indicating a recommended style in the styles indicated by the server information;
   a setting unit operable to set a style of data to be transmitted by the communication device to either a style acceptable to the second server according to the server basic information acquired from the first server or the recommended style indicated by the server recommendation information acquired from the first server;
   a converting unit operable to convert a style of data to be transmitted based on the setting by the setting unit; and
   a transmitting unit operable to transmit data converted by the converting unit to the first server, wherein:
   the styles of data acceptable to the second server as indicated by the server basic information are the constraint conditions of data which define parameters of data that the second server is capable of handling; and
   the recommended style of data indicated by the server recommendation information is recommended data which falls within the parameters of data defined by the constraint conditions of the server basic information.

2. The communication device according to claim 1, further comprising a display unit operable to display an image based on the server information.

3. The communication device according to claim 1, wherein
   the styles of data acceptable to the second server includes at least one of a format of image data which can handled by the second server, a size of the image data which can handled by the second server, the number of pixels of the image data which can handled by the second server, and a bit rate of transferring the image data which can handled by the second server.

4. The communication device according to claim 1, wherein the server recommendation information acquired by the acquiring unit is generated by the first server based on the server information of the second server.

5. The communication device according to claim 1, wherein the constraint conditions include:
   a supported image format which can handled by the second server;
   a maximum upload size which can handled by the second server;
   a maximum number of upload pixels which can handled by the second server; and
   a maximum upload bit rate which can handled by the second server.

6. A relay server for receiving data from a communication device and transmitting the received data to a target server, the relay server comprising:
   an acquiring unit operable to acquire, from the target server, server information as information indicating styles of data acceptable to the target server, the server information being configured by server basic information as information indicating constraint conditions of data to be satisfied in order to be acceptable to the target server; and
   a transmitting unit operable to transmit the server basic information and server recommendation information to the communication device, the server recommendation information indicating a recommended style in the styles of data acceptable to the target server, wherein:
   the styles of data acceptable to the target server as indicated by the server basic information are the constraint conditions of data which define parameters of data that the target server is capable of handling; and
   the recommended style of data indicated by the server recommendation information is recommended data which falls within the parameters of data defined by the constraint conditions of the server basic information.

7. The relay server according to claim 6, further comprising
   a generating unit operable to generate the server recommendation information based on the server information.

8. The relay server according to claim 6, wherein
   the styles of the data acceptable to the target server includes at least one of a format of image data which can handled by the target server, a size of the image data which can handled by the target server, the number of pixels of the image data which can handled by the target server, and a bit rate of transferring the image data which can handled by the target server.

9. A communication system for transmitting data to a target server, comprising:
   a relay server; and
   a communication device, wherein
   the relay server includes
   an information acquiring unit operable to acquire, from the target server, server information as information indicating styles of data acceptable to the target server, the server information being configured by server basic information as information indicating constraint conditions of data to be satisfied in order to be acceptable to the target server, and
   an information transmitting unit operable to transmit the server basic information and server recommendation information to the communication device, the server recommendation information indicating a recommended style in the styles of data acceptable to the target server, and the communication device includes a communication acquiring unit operable to acquire the server basic information and the server recommendation information from the relay server, a setting unit operable to set a style of data to be transmitted by the communication device to either a style acceptable to the second server according to the server basic information acquired from the relay server or the recommended style indicated by the server recommendation information acquired from the relay server, a converting unit operable to convert a style of data to be transmitted based on the setting by the setting unit, and a communication transmitting unit operable to transmit data converted by the converting unit to the relay server, wherein:

the styles of data acceptable to the target server as indicated by the server basic information are the constraint conditions of data which define parameters of data that the target server is capable of handling; and the recommended style of data indicated by the server recommendation information is recommended data which falls within the parameters of data defined by the constraint conditions of the server basic information.

10. The communication system according to claim 9, wherein the communicating device further includes a display unit operable to display an image based on the server information.

11. The communication system according to claim 9, wherein the relay server further includes a generating unit operable to generate the server recommendation information based on the server information.

12. The communication system according to claim 9, wherein the styles of data acceptable to the target server includes at least one of a format of image data which can handled by the target server, a size of the image data which can handled by the target server, the number of pixels of the image data which can handled by the target server, and a bit rate of transferring the image data which can handled by the target server.

\* \* \* \* \*